United States Patent
Tan et al.

(10) Patent No.: US 9,311,071 B2
(45) Date of Patent: Apr. 12, 2016

(54) FORCE UPGRADE OF A MOBILE APPLICATION VIA A SERVER SIDE CONFIGURATION FILE

(71) Applicant: Box, Inc., Los Altos, CA (US)

(72) Inventors: Simon Tan, Daly City, CA (US); David Maynard, Menlo Park, CA (US); Rico Yao, San Jose, CA (US); Don Cung, Palo Alto, CA (US)

(73) Assignee: Box, Inc., Redwood City, CA (US)

( * ) Notice: Subject to any disclaimer, the term of this patent is extended or adjusted under 35 U.S.C. 154(b) by 25 days.

(21) Appl. No.: 13/776,467

(22) Filed: Feb. 25, 2013

(65) Prior Publication Data

US 2014/0068588 A1    Mar. 6, 2014

Related U.S. Application Data

(60) Provisional application No. 61/697,469, filed on Sep. 6, 2012.

(51) Int. Cl.
*G06F 9/445* (2006.01)

(52) U.S. Cl.
CPC ... *G06F 8/65* (2013.01); *G06F 8/67* (2013.01)

(58) Field of Classification Search
CPC .................................................. G06F 8/60–8/68
USPC .................................................. 717/168–178
See application file for complete search history.

(56) References Cited

U.S. PATENT DOCUMENTS

| 5,799,320 A | 8/1998 | Klug |
| 5,848,415 A | 12/1998 | Guck |
| 5,864,870 A | 1/1999 | Guck |
| 5,999,908 A | 12/1999 | Abelow |
| 6,034,621 A | 3/2000 | Kaufman |

(Continued)

FOREIGN PATENT DOCUMENTS

| CA | 2724521 | 11/2009 |
| CN | 101997924 A | 3/2011 |

(Continued)

OTHER PUBLICATIONS

Vartiainen, E., et al., Auto-update: a concept for automatic downloading of web content to a mobile device, Proceedings of Mobility '07, 2007, pp. 683-689, [retrieved on Nov. 25, 2015], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Perkins Coie LLP

(57) ABSTRACT

Systems and methods which forces or automatically upgrades a mobile application installed on a mobile device for security, stability or any other concerns via a server-side configuration file are disclosed. In one embodiment, a configuration file including a list of build identifiers that have been banned or flagged is placed on a server, which can be a server providing cloud-based collaboration or file sharing services, for access by associated mobile applications and/or devices. A mobile application installed on a mobile device can download the configuration file and determine whether a build identifier of the mobile application is listed on the configuration file. If so, the mobile application can shut down, prompt or force an upgrade, or restrict operation of the mobile application in other ways.

23 Claims, 9 Drawing Sheets

(56) References Cited

U.S. PATENT DOCUMENTS

| | | | |
|---|---|---|---|
| 6,055,543 A | 4/2000 | Christensen et al. | |
| 6,073,161 A | 6/2000 | DeBoskey et al. | |
| 6,098,078 A | 8/2000 | Gehani et al. | |
| 6,233,600 B1 | 5/2001 | Salas et al. | |
| 6,289,345 B1 | 9/2001 | Yasue | |
| 6,292,803 B1 | 9/2001 | Richardson et al. | |
| 6,336,124 B1 | 1/2002 | Alam et al. | |
| 6,342,906 B1 | 1/2002 | Kumar et al. | |
| 6,345,386 B1 | 2/2002 | Delo et al. | |
| 6,370,543 B2 | 4/2002 | Hoffert et al. | |
| 6,374,260 B1 | 4/2002 | Hoffert et al. | |
| 6,385,606 B2 | 5/2002 | Inohara et al. | |
| 6,396,593 B1 | 5/2002 | Laverty et al. | |
| 6,515,681 B1 | 2/2003 | Knight | |
| 6,539,381 B1 | 3/2003 | Prasad et al. | |
| 6,584,466 B1 | 6/2003 | Serbinis et al. | |
| 6,636,872 B1 | 10/2003 | Heath et al. | |
| 6,654,737 B1 | 11/2003 | Nunez | |
| 6,662,186 B1 | 12/2003 | Esquibel et al. | |
| 6,687,878 B1 | 2/2004 | Eintracht et al. | |
| 6,714,968 B1 | 3/2004 | Prust | |
| 6,735,623 B1 | 5/2004 | Prust | |
| 6,742,181 B1 | 5/2004 | Koike et al. | |
| 6,760,721 B1 | 7/2004 | Chasen et al. | |
| 6,947,162 B2 | 9/2005 | Rosenberg et al. | |
| 6,952,724 B2 | 10/2005 | Prust | |
| 6,996,768 B1 | 2/2006 | Elo et al. | |
| 7,010,752 B2 | 3/2006 | Ly | |
| 7,020,697 B1 | 3/2006 | Goodman et al. | |
| 7,039,806 B1 | 5/2006 | Friedman et al. | |
| 7,069,393 B2 | 6/2006 | Miyata et al. | |
| 7,130,831 B2 * | 10/2006 | Howard et al. | 705/57 |
| 7,133,834 B1 | 11/2006 | Abelow | |
| 7,149,787 B1 | 12/2006 | Mutalik et al. | |
| 7,152,182 B2 | 12/2006 | Ji et al. | |
| 7,155,483 B1 | 12/2006 | Friend et al. | |
| 7,165,107 B2 | 1/2007 | Pouyoul et al. | |
| 7,222,078 B2 | 5/2007 | Abelow | |
| 7,275,244 B1 | 9/2007 | Bell et al. | |
| 7,296,025 B2 | 11/2007 | Kung et al. | |
| 7,346,778 B1 | 3/2008 | Guiter et al. | |
| 7,353,252 B1 | 4/2008 | Yang et al. | |
| 7,370,269 B1 | 5/2008 | Prabhu et al. | |
| 7,401,117 B2 | 7/2008 | Dan et al. | |
| 7,543,000 B2 | 6/2009 | Castro et al. | |
| 7,581,221 B2 | 8/2009 | Lai et al. | |
| 7,620,565 B2 | 11/2009 | Abelow | |
| 7,647,559 B2 | 1/2010 | Yozell-Epstein et al. | |
| 7,650,367 B2 | 1/2010 | Arruza | |
| 7,661,088 B2 | 2/2010 | Burke | |
| 7,665,093 B2 | 2/2010 | Maybee et al. | |
| 7,676,542 B2 | 3/2010 | Moser et al. | |
| 7,698,363 B2 | 4/2010 | Dan et al. | |
| 7,734,600 B1 | 6/2010 | Wise et al. | |
| 7,756,843 B1 | 7/2010 | Palmer | |
| 7,774,412 B1 | 8/2010 | Schnepel | |
| 7,814,426 B2 | 10/2010 | Huesken et al. | |
| 7,886,287 B1 * | 2/2011 | Davda | 717/168 |
| 7,890,964 B2 | 2/2011 | Vogler-Ivashchanka et al. | |
| 7,937,663 B2 | 5/2011 | Parker et al. | |
| 7,958,453 B1 | 6/2011 | Taing | |
| 7,979,296 B2 | 7/2011 | Kruse et al. | |
| 7,996,374 B1 | 8/2011 | Jones et al. | |
| 8,027,976 B1 | 9/2011 | Ding et al. | |
| RE42,904 E | 11/2011 | Stephens, Jr. | |
| 8,065,739 B1 | 11/2011 | Bruening et al. | |
| 8,090,361 B2 | 1/2012 | Hagan | |
| 8,103,662 B2 | 1/2012 | Eagan et al. | |
| 8,117,261 B2 | 2/2012 | Briere et al. | |
| 8,140,513 B2 | 3/2012 | Ghods et al. | |
| 8,151,183 B2 | 4/2012 | Chen et al. | |
| 8,185,830 B2 | 5/2012 | Saha et al. | |
| 8,214,747 B1 | 7/2012 | Yankovich et al. | |
| 8,230,348 B2 | 7/2012 | Peters et al. | |
| 8,347,276 B2 | 1/2013 | Schadow | |
| 8,358,701 B2 | 1/2013 | Chou et al. | |
| 8,429,540 B1 | 4/2013 | Yankovich et al. | |
| 8,464,161 B2 | 6/2013 | Giles et al. | |
| 8,527,549 B2 | 9/2013 | Cidon | |
| 8,549,066 B1 | 10/2013 | Donahue et al. | |
| 8,549,511 B2 * | 10/2013 | Seki et al. | 717/170 |
| 8,607,306 B1 | 12/2013 | Bridge et al. | |
| 8,849,955 B2 | 9/2014 | Prahlad et al. | |
| 9,002,574 B2 * | 4/2015 | Garrett et al. | 701/34.4 |
| 2001/0027492 A1 | 10/2001 | Gupta | |
| 2002/0091738 A1 | 7/2002 | Rohrabaugh et al. | |
| 2002/0099772 A1 | 7/2002 | Deshpande et al. | |
| 2002/0133509 A1 | 9/2002 | Johnston et al. | |
| 2002/0147770 A1 | 10/2002 | Tang | |
| 2002/0194177 A1 | 12/2002 | Sherman et al. | |
| 2003/0041095 A1 | 2/2003 | Konda et al. | |
| 2003/0084306 A1 | 5/2003 | Abburi et al. | |
| 2003/0093404 A1 | 5/2003 | Bader et al. | |
| 2003/0108052 A1 | 6/2003 | Inoue et al. | |
| 2003/0110264 A1 | 6/2003 | Whidby et al. | |
| 2003/0135536 A1 | 7/2003 | Lyons | |
| 2003/0135565 A1 | 7/2003 | Estrada | |
| 2003/0154306 A1 | 8/2003 | Perry | |
| 2003/0204490 A1 | 10/2003 | Kasriel | |
| 2003/0217171 A1 | 11/2003 | Von Stuermer et al. | |
| 2004/0021686 A1 | 2/2004 | Barberis | |
| 2004/0088647 A1 | 5/2004 | Miller et al. | |
| 2004/0103147 A1 | 5/2004 | Flesher et al. | |
| 2004/0111415 A1 | 6/2004 | Scardino et al. | |
| 2004/0117438 A1 | 6/2004 | Considine et al. | |
| 2004/0122949 A1 | 6/2004 | Zmudzinski et al. | |
| 2004/0128359 A1 | 7/2004 | Horvitz et al. | |
| 2004/0177138 A1 | 9/2004 | Salle et al. | |
| 2004/0181579 A1 | 9/2004 | Huck et al. | |
| 2004/0230624 A1 | 11/2004 | Frolund et al. | |
| 2004/0246532 A1 | 12/2004 | Inada | |
| 2004/0267836 A1 | 12/2004 | Armangau et al. | |
| 2005/0005276 A1 | 1/2005 | Morgan | |
| 2005/0010860 A1 | 1/2005 | Weiss et al. | |
| 2005/0022229 A1 | 1/2005 | Gabriel et al. | |
| 2005/0028006 A1 | 2/2005 | Leser et al. | |
| 2005/0050228 A1 | 3/2005 | Perham et al. | |
| 2005/0063083 A1 | 3/2005 | Dart et al. | |
| 2005/0097225 A1 | 5/2005 | Glatt et al. | |
| 2005/0108406 A1 | 5/2005 | Lee et al. | |
| 2005/0114305 A1 | 5/2005 | Haynes et al. | |
| 2005/0114378 A1 | 5/2005 | Elien et al. | |
| 2005/0182966 A1 | 8/2005 | Pham et al. | |
| 2005/0198299 A1 | 9/2005 | Beck et al. | |
| 2005/0198452 A1 | 9/2005 | Watanabe | |
| 2005/0234864 A1 | 10/2005 | Shapiro | |
| 2005/0234943 A1 | 10/2005 | Clarke | |
| 2005/0261933 A1 | 11/2005 | Magnuson | |
| 2006/0005163 A1 | 1/2006 | Huesken et al. | |
| 2006/0026502 A1 | 2/2006 | Dutta | |
| 2006/0026535 A1 | 2/2006 | Hotelling et al. | |
| 2006/0036568 A1 | 2/2006 | Moore et al. | |
| 2006/0041603 A1 | 2/2006 | Paterson et al. | |
| 2006/0047804 A1 | 3/2006 | Fredricksen et al. | |
| 2006/0053088 A1 | 3/2006 | Ali et al. | |
| 2006/0053380 A1 | 3/2006 | Spataro et al. | |
| 2006/0070083 A1 | 3/2006 | Brunswig et al. | |
| 2006/0075071 A1 | 4/2006 | Gillette | |
| 2006/0123062 A1 | 6/2006 | Bobbitt et al. | |
| 2006/0133340 A1 | 6/2006 | Rybak et al. | |
| 2006/0168550 A1 | 7/2006 | Muller et al. | |
| 2006/0174051 A1 | 8/2006 | Lordi et al. | |
| 2006/0174054 A1 | 8/2006 | Matsuki | |
| 2006/0179070 A1 | 8/2006 | George et al. | |
| 2006/0242204 A1 | 10/2006 | Karas et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2007/0016680 A1 | 1/2007 | Burd et al. | |
| 2007/0038934 A1 | 2/2007 | Fellman | |
| 2007/0100830 A1 | 5/2007 | Beedubail et al. | |
| 2007/0115845 A1 | 5/2007 | Hochwarth et al. | |
| 2007/0118598 A1 | 5/2007 | Bedi et al. | |
| 2007/0124460 A1 | 5/2007 | McMullen et al. | |

(56) References Cited

U.S. PATENT DOCUMENTS

| | | |
|---|---|---|
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0256065 A1 | 11/2007 | Heishi et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0031245 A1* | 2/2010 | Meller ............... G06F 8/67 717/170 |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0162365 A1 | 6/2010 | Del Real |
| 2010/0162374 A1* | 6/2010 | Nair .................................. 726/7 |
| 2010/0179940 A1 | 7/2010 | Gilder et al. |
| 2010/0185463 A1 | 7/2010 | Noland et al. |
| 2010/0191689 A1 | 7/2010 | Cortes et al. |
| 2010/0192126 A1* | 7/2010 | Seki et al. .................. 717/121 |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0322252 A1 | 12/2010 | Suganthi et al. |
| 2010/0325155 A1 | 12/2010 | Skinner et al. |
| 2010/0325655 A1 | 12/2010 | Perez |
| 2010/0332401 A1 | 12/2010 | Prahlad et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |

(56) References Cited

U.S. PATENT DOCUMENTS

| | | |
|---|---|---|
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0072895 A1* | 3/2012 | Koyama et al. ............... 717/168 |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0110005 A1 | 5/2012 | Kuo et al. |
| 2012/0110436 A1 | 5/2012 | Adler, III et al. |
| 2012/0117626 A1 | 5/2012 | Yates et al. |
| 2012/0124306 A1 | 5/2012 | Abercrombie et al. |
| 2012/0124541 A1 | 5/2012 | Halbedel |
| 2012/0124570 A1* | 5/2012 | Alberth, Jr. ............... G06F 8/65 717/173 |
| 2012/0130900 A1 | 5/2012 | Tang et al. |
| 2012/0134491 A1 | 5/2012 | Liu |
| 2012/0136936 A1 | 5/2012 | Quintuna |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0250106 A1* | 10/2012 | Kiran Kannambadi et al. ............... G06F 8/65 358/474 |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1* | 3/2014 | Barak ............... 717/170 |
| 2014/0156373 A1 | 6/2014 | Roberts et al. |
| 2014/0172595 A1 | 6/2014 | Beddow et al. |
| 2014/0223423 A1* | 8/2014 | Alsina ............... G06F 8/65 717/173 |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 | 10/2008 |
| KR | 20020017444 A | 3/2002 |
| KR | 20040028036 | 4/2004 |
| KR | 20050017674 | 2/2005 |
| KR | 20060030306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2008011142 A2 | 1/2008 |
| WO | WO-2008076520 A2 | 6/2008 |
| WO | WO-2011109416 A2 | 9/2011 |

(56) References Cited

FOREIGN PATENT DOCUMENTS

| WO | WO-2012167272 A1 | 12/2012 |
|---|---|---|
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

Adi, W., et al., Secured Mobile Device Software Update over IP Networks, Proceedings of SoutheastCon, 2004, pp. 271-274, [retrieved on Nov. 25, 2015], Retrieved from the Internet: <URL:http://ieeexplore.ieee.org/>.*
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Palmer, "Load Balancing FTP Servers," BlogNav, Oct. 2008, 2 pages.
Partial International Search Report for PCT/US2011/041308 dated Feb. 27, 2012, pp. 1- 2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
International Search Report and Written Opinion for PCT/US2010/070366, Applicant: Box, Inc., Mailed Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
"PaperPort Professional 14," PC Mag. Corn review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Google Docs, http://web. Archive.org/web/20100413105758/http://en.wikipedia.org/wiki/Google_docs, Apr. 13, 2010, 6 pages.
International Search Report and Written Opinion for PCT/US2013/039782, Applicant: Box, Inc., Mailed Aug. 28, 2013, 15 pages.
Patent Court Document of Approved Judgment for GB0602349.3 and GB0623571.7; Mar. 3, 2009, 17 pages.
International Search Report and Written Opinion for PCT/US2013/034765, Applicant: Box, Inc., Mailed Jan. 20, 2014, 15 pages.
Exam Report for EP13185269.1, Applicant: Box, Inc. Mailed Jan. 28, 7 pages.
"Average Conversion Time for a D60 RAW file?" http://www.dpreview.com, Jul. 22, 2002, 4 pages.
"Revolving sync conflicts; frequently asked questions," Microsoft Tech Support, Jul. 16, 2012, retrieved from the Internet: http://web.archive.org/web, 2 pages.

(56) References Cited

OTHER PUBLICATIONS

"Troubleshoot sync problems," Microsoft Tech Support: May 2, 2012, retrieved from the internet, http://web.Archive.org/web, 3 pages.
"Tulsa TechFest 2012—Agenda," retrieved from the website, http://web.archive.org, Oct. 2, 2012, 2 pages.
Burns, "Developing Secure Mobile Applications for Android," Oct. 2008, Version 1.0, 1-28 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
Exam Report for GB1318792.7, Applicant: Box, Inc. Mailed May 22, 2014, 2 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc To Add HTML5 Document Converter And Sleek Content Viewing Experience To Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Search Report for EP 11729851.3, Applicant: Box, Inc. Mailed Feb. 7, 2014, 9 pages.
Sommerer, "Presentable Document Format: Improved On-demand PDF to HTML Conversion," retrieved from the internet, http://research.microsoft.com, Nov. 2004, 8 pages.
Exam Report for GB1410569.6 Applicant: Box, Inc. Mailed Jul. 11, 2014, 9 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for Ep 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.

\* cited by examiner

FORCE UPGRADE OF A MOBILE APPLICATION VIA A SERVER SIDE CONFIGURATION FILE

CROSS-REFERENCE TO RELATED APPLICATION

The present application claims priority to and benefit from U.S. Provisional Patent Application Ser. No. 61/697,469 titled "Force Upgrade Of A Mobile Application Via Server Side Configuration Files", filed on Sep. 6, 2012, the content of which is incorporated by reference herein.

BACKGROUND

Mobile, and some desktop applications are distributed through online market places or stores, such as the App Store, Chrome Web Store, Google Play/Android Market, Windows Store, and the like. Applications can be updated for various reasons such as to fix bugs, add features, remove security vulnerabilities, and the like. The updated, new versions of applications are placed on the online market places for distribution. An online market place can push notification regarding availability of updates to users' client devices. However, the notification merely informs users regarding updates, but does not force users to upgrade their applications. Users may then not be able to take advantage of the new features, stability, security improvements, etc., provided by new versions of applications.

DETAILED DESCRIPTION

Figure 1:
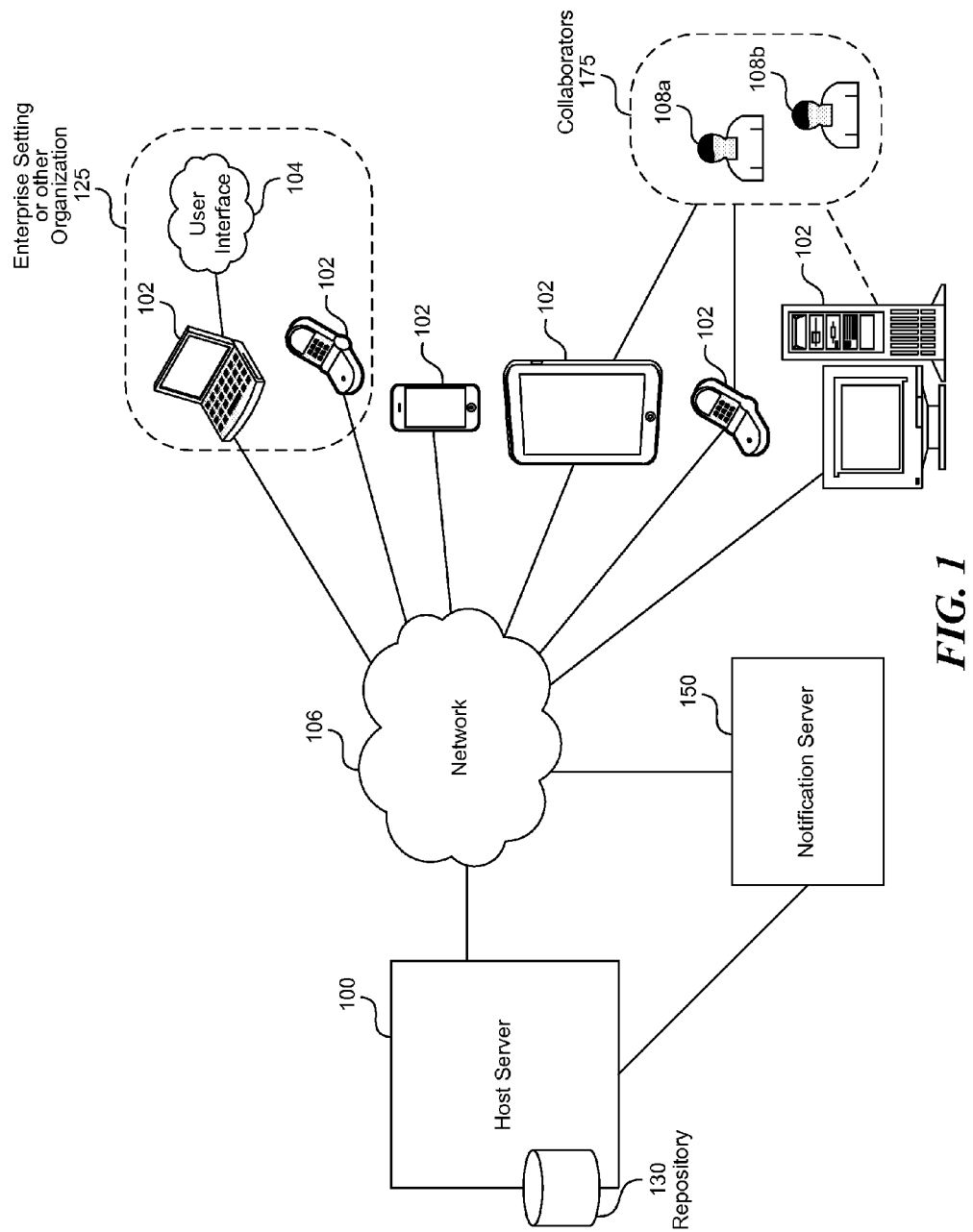
FIG. 1 illustrates an example diagram of a system having a host server of a cloud service and/or cloud storage accounts accessible via a mobile application that can force upgrade to another version of the mobile application based on a server-side configuration file.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for forcing upgrade of a mobile application using a server-side configuration file. In one implementation, the disclosed systems and methods are implemented in a cloud-based environment or platform.

If an event that exposes a security flaw or causes severe data loss in some versions of a mobile application occurs, a 'kill switch' or a way to force all users to upgrade their applications would help avoid the negative ramifications. The disclosed systems and methods force upgrade of a mobile application by hosting a configuration file on a server (e.g., a server enabling or providing cloud services, cloud-based storage, collaboration and/or file sharing services) that the associated mobile clients/applications can regularly access and read. In one implementation, the file can include, for example, build identifiers, and if a particular instance of an associated mobile client/application detects that it is one of the banned or flagged versions, the mobile application can destroy itself, disable itself, prompt an upgrade, force an upgrade, or perform other operations. Other solutions can include using a push notification to call the attention to an update or a combination thereof.

Specifically, the file stored on the server can include a list of build identifiers or build IDs. Each build identifier is a unique identifier, corresponding to a version of the mobile application released for download and use by users. In one implementation, the build identifier can be in the form of a hash (e.g., SHA1 cryptographic hash). In one implementation, a mobile application on a client device can download the configuration file in the background every once in a while or when triggered, to confirm that the build identifier of the mobile application is not on the banned or flagged list. The frequency with which the file is downloaded or otherwise accessed can be configurable or reconfigurable based on various criteria or can change with certain detected events.

If the mobile application detects that its version is flagged or banned based on the list, the mobile application can be configured to refuse to perform select or all useful functionality and instead direct the user to upgrade the application from the application marketplaces. In one implementation, the force upgrading of a mobile application can be the equivalent of a "kill switch" feature for once-in-a-lifetime events that create situations where it is optimal for all users to upgrade their mobile applications or other client software, for security, compatibility, or any other reasons.

Various aspects of the cloud-based platform and the systems and methods for forcing upgrade of a mobile application via a server-side configuration file will now be described. It should be noted that the disclosed systems and methods are equally applicable to various applications (e.g., browsers, toolbars, software packages such as Word, Excel, Photoshop, etc.) installed on desktop computers, laptop computers and other devices. In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

FIG. 1 illustrates an example diagram of a system having a host server of a cloud service and/or cloud storage accounts accessible via a mobile application that can force upgrade to another version of the mobile application based on a server-side configuration file.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
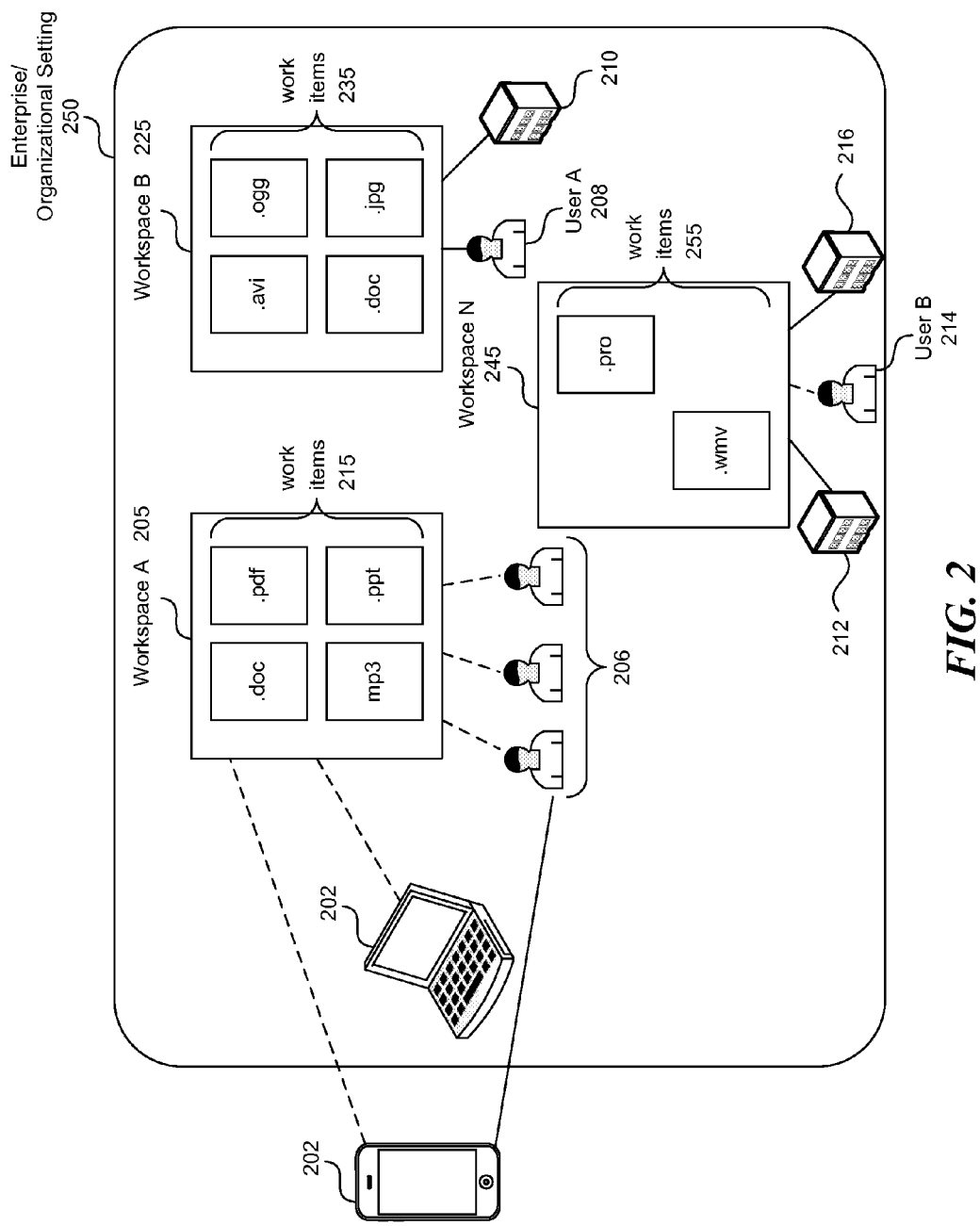
FIG. 2 depicts a diagram of a web-based or online collaboration platform deployed in an enterprise or other organizational setting for organizing work items and workspaces, as one example of a hosted cloud service and/or cloud storage accounts accessible via a mobile application that can force upgrade to another version of the mobile application based on a server-side configuration file.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of cloud-based services and/or cloud storage such as an online or web-based collaboration environment is able to track or monitor the devices used by users to access content or activities. In one implementation, such tracking or monitoring may be performed upon receiving explicit permission or authorization from users.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service accessible via a mobile application that forces upgrade to a new version based on a server-side configuration file.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215, 235, and 255 may be unique to each work space but need not be. For example, a particular word document may be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, . . . , N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
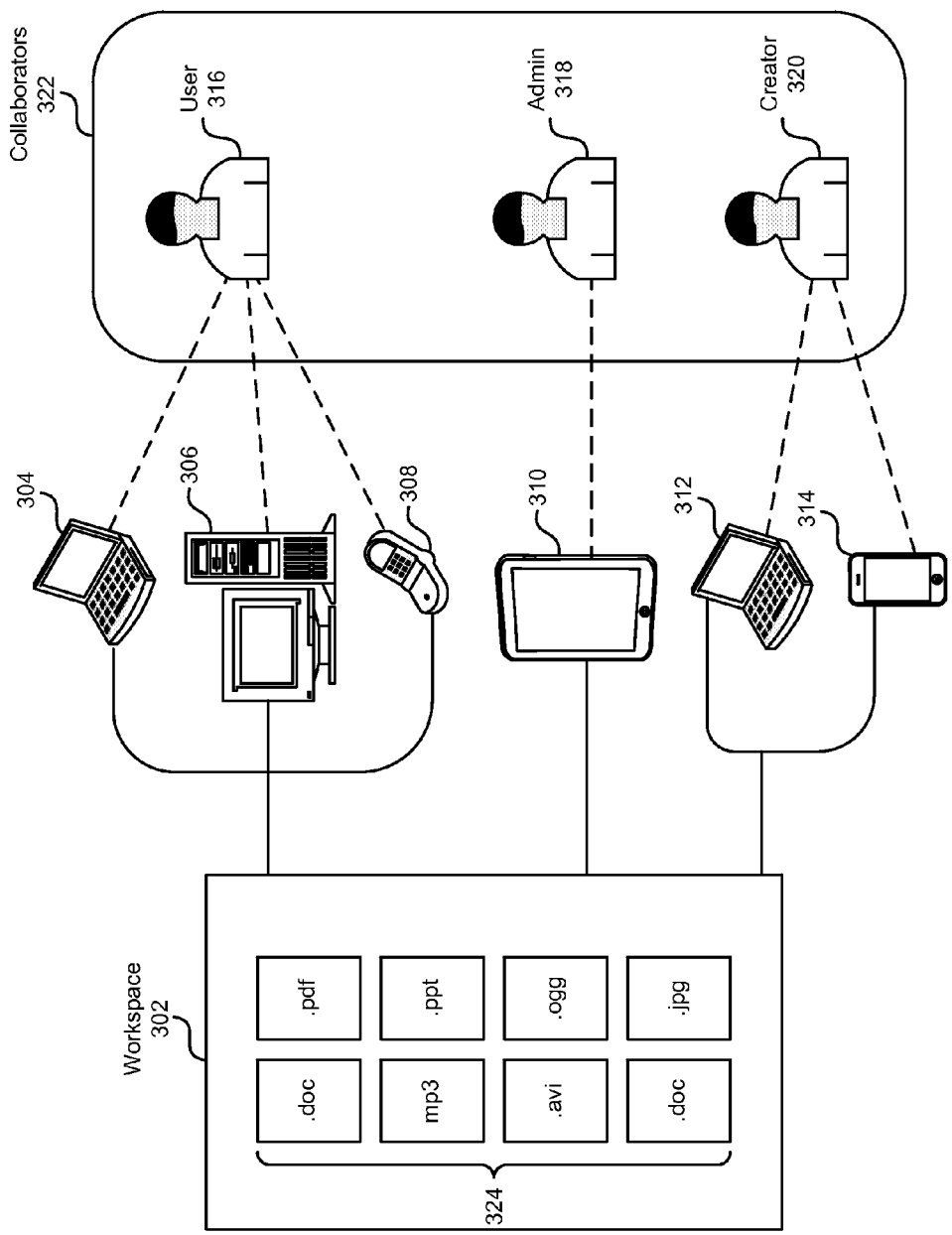
FIG. 3 depicts an example diagram of a workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Figure 4:
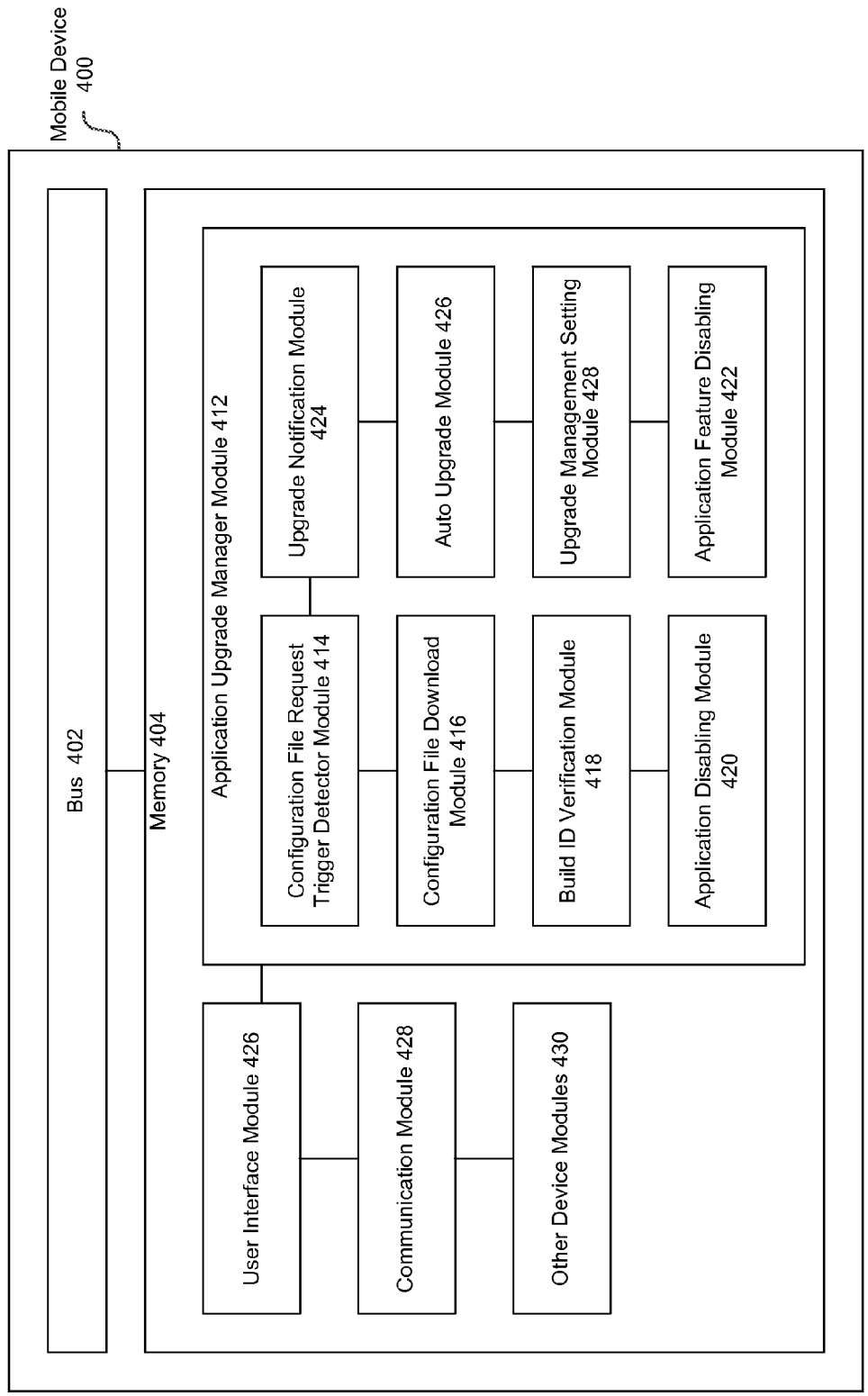
FIG. 4 depicts a block diagram illustrating example components in a client device with a mobile application that forces upgrade of the mobile application to another version based on a server-side configuration file.

FIG. 4 depicts a block diagram illustrating example components in a mobile device having a mobile application that forces upgrade to a new version based on a server-side configuration file.

The mobile device 400 can be any of the client devices 102 described above. The mobile device 400 can include, for example, a bus 402 and a memory 404 among other components. The memory 404 may include an application upgrade manager module 412, a user interface module 426, a communication module 428, and other device modules 430.

The bus 402 is a subsystem for transferring data between the components of the mobile device 400. For example, the bus 402 facilitates the transfer of data between the memory 404 and other components of the mobile device such as the processor and/or the input/output components that utilize the data.

As used herein, a "module," "a manager," "a handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. §101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the application upgrade manager module 412 initiates and/or forces upgrade of a mobile application installed on the mobile device 400. The application upgrade manager module 412 can include components such as a configuration file request event detector module 414, a configuration file download module 416, a build identifier verification module 418, an application disabling module 420, an application feature disabling module 422, an upgrade notification module 424, an auto upgrade module 426 and an upgrade management setting module 428. One or more of these modules may be consolidated into a single module in some implementations. For example, the application disabling module 420 can incorporate the function of the application feature disabling module 422.

The configuration file request event detector module 414 can detect certain events to trigger download of a configuration file by the configuration file download module 416. A configuration file is hosted on a server such as the host server 100 and can be accessed by a mobile application associated with the server. The configuration file can include a list of build identification numbers or build identifiers. Each build identifier is a unique identifier, corresponding to a version of the mobile application released for download and use by users. In one implementation, the build identifier can be in the form of a hash (e.g., SHA1 cryptographic hash).

The build identifiers listed in the configuration file are blacklisted, flagged, banned, or deemed unsuitable for use due to instability, security vulnerability, lack of functionality, or any other reasons. In one implementation, if a mobile application's build identifier is blacklisted, the mobile application can be subject to operational restrictions. In another implementation, a mobile application having a build identifier that is listed on the configuration file must be upgraded to another version that has not been blacklisted in order for a user to utilize select or all functions of the mobile application. The host server 100 can update the configuration file to add build identifiers of any mobile application versions/releases that the developer of the mobile application wants to make obsolete and force the users to upgrade to another application version.

In one implementation, the configuration file request event detector 414 can receive, detect and/or process a push notification from the host server 100 and/or the notification server 150. In one implementation, the push notification can include a message to inform the mobile application that the configuration file on the host server 100 has been updated. The message can the trigger the configuration file download module 416 to download the configuration file from the host server 100, for example. In one implementation, the push notification can include the configuration file, in which case, implementation of the configuration file download module 416 would be redundant and unnecessary. In other implementations, the configuration file request event detector module 414 can detect other events such as the launch of the mobile application or scheduled events (e.g., every week, every month, etc.) to trigger the configuration file download module 416 to download the configuration file from the host server 100 to the mobile device 400.

The configuration file download module 416 can establish a new connection to the host server 100 or leverage an existing connection to the host server 100 to download the configuration file to the mobile device 400. In one implementation, the downloaded configuration file may be stored temporarily in cache for reading by the build identifier verification module 418, and can be discarded later.

The build identifier verification module 418 can retrieve the build identifier of the installed mobile application, and open and read the configuration file to get a list of build identifiers that have been blacklisted. The verification module 418 can compare the build identifier of the installed mobile application against the blacklisted build identifiers to determine if the installed mobile application is one of the blacklisted versions.

Depending on the implementation, the verification module 418 can trigger the application disabling module 420 or the application feature disabling module 422 when the verification module 418 determines that the build identifier of the installed mobile application has been blacklisted. The application disabling module 420 can shut down or disable the installed mobile application such that a user cannot use any functions of the mobile application, until the mobile application is updated or upgraded, for example, via an online market place. The application feature disabling module 422 can disable select features or functions of the installed mobile application. For example, an exporting function of a mobile application can be selectively disabled or turned off if the mobile application has a security vulnerability that can make exported data public.

The upgrade notification module 424 can generate and display notifications to a user. The notifications can be regarding a mobile application being shut down or disabled, or select features being turned off. The notifications can inform the user to update the mobile application by downloading an updated version of the mobile application from a market place. In a further implementation, the notification can identify or link the user to the recommended version of the mobile application in the market place.

In one implementation, the auto upgrade module 426 can automatically upgrade a mobile application if the installed mobile application has been blacklisted as determined by the build identifier verification module 418. In one implementation, the auto upgrade module 426 can trigger download of another version (e.g., new version or a recommended version that is not necessarily new) of the mobile application to the mobile device 400. In some implementations, the auto upgrade module 426 can also install, automatically or with explicit user confirmation, the downloaded mobile application on the mobile device 400. The auto upgrade module 426 may be turned on or off based on the upgrade management setting module 428 in one implementation. The upgrade management setting module 428 can include user preferences for notifying a user regarding blacklisted versions of the mobile application, select functions or all functions of a mobile application turned off or disabled, automatic download and/or installation of a mobile application suitable for the mobile device 400 and/or the operating system.

The user interface module 426 may generate user interfaces relating to upgrade of the mobile application. The user interface module 406 may include a rendering engine for rendering user interface graphics for display on the mobile device. Other modules such as the application upgrade manager module 412, the communication module 428 and other device modules 430 can trigger the user interface module 426. For example, the upgrade notification module 424 can trigger the user interface module 426 to display notifications to the user. By way of another example, the upgrade management setting module 428 can leverage the user interface module 426 to display setting options for configuration by the user.

The communication module 428 can facilitate communication between the mobile device 400 and any of the host server 100, the notification server 150 and the like, using any of the communication protocols supported by the mobile device 400 and the servers. The other device modules 430 can include other modules such as a GPS module for determining and providing location information, text input module for accepting and processing inputs provided using different input mechanisms of the mobile device, and the like for handling various functions of the mobile device 400. Additional or less components/modules/engines can be included in the mobile device 400 and each illustrated component.

Figure 5:
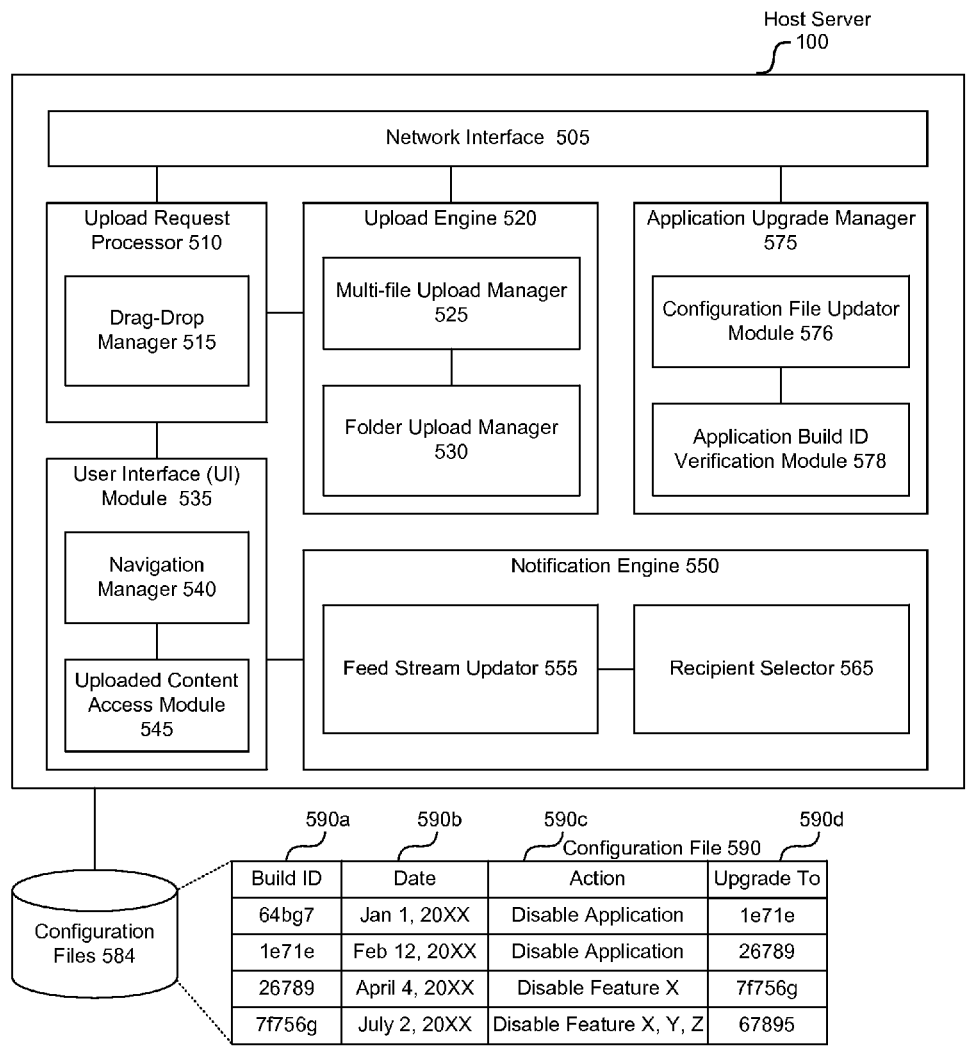
FIG. 5 depicts a block diagram illustrating example components in a host server for cloud-based services (e.g., collaborative and/or file sharing) and storage services accessible via a mobile application that forces upgrade of the mobile application to another version based on a server-side configuration file.

FIG. 5 depicts a block diagram illustrating example components in a host server for cloud-based services (e.g., collaborative and/or file sharing) and storage services accessible via a mobile application that forces upgrade to a new version based on a server-side configuration file.

The host server 100 of the web-based or online collaboration environment can generally be a cloud-based service. The host server 100 can include, for example, a network interface 505, an upload request processor 510 having a drag-drop manager 515 and an upload engine 520 having a multi-file upload manager 525 and/or a folder upload manager 530. The host server 100 can also include a user interface module 535 having a navigation manager 540 and/or an uploaded content access module 545.

One embodiment of the host server 100 can include an application upgrade manager 575 having a configuration file updator module 576 and an application build identifier verification module 578. Another embodiment of the host server 100 further includes a notification engine 550 having, for example, a feed stream updator 555 and a recipient selector 565. Additional or less components/modules/engines can be included in the host server 100 and each illustrated component.

The network interface 505 can be a networking module that enables the host server 100 to mediate data in a network with an entity that is external to the host server 100, through any known and/or convenient communications protocol supported by the host and the external entity. The network interface 505 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

One embodiment of the host server 100 includes the upload request processor 510 which can receive, detect, process, identify, parse, translate, and/or determine an upload request. An upload request can be submitted by a user through a user interface of the collaboration platform to upload one or multiple items.

The user can identify the files, content, or work items to be uploaded to the host server 100 one-by-one and queue up multiple items (e.g., including but not limited to files, folders, documents, images, audio, etc.) to be uploaded in a single request. The user can also select all of the items to be uploaded in a single action (e.g., via highlighting or otherwise selecting of icons corresponding to each of the items). In one embodiment, the upload request is generated via a drag-and-drop action of the multiple work items to be uploaded to the host server into a portion of a user interface. Drag-and-drop activated uploaded requests can be detected, handled, received, processed, and/or otherwise managed by the drag-drop manager 515.

In one embodiment, the upload request is generated via a drag-and-drop action of a single folder which includes the multiple work items to be uploaded to the host server 100. For example, the upload request can be generated when a folder having the multiple items on a client device that is to be uploaded is identified through the user interface. In some instances, the folder can include additional folders in a folder hierarchy of multiple items.

In some instances, the user can generate an upload request by activating the upload feature in a tab on a user interface and initiate uploading by selecting (e.g., clicking on or otherwise activating) a button/tab. Once selected, another user interface or a pop-up window may appear allowing the user to navigate through files or folders to select the items to be uploaded.

Once upload requests have been detected and processed, the upload engine 520 can upload the requested item or multiple requested items. The upload engine 520 can, in one embodiment, upload a single item or multiple items (e.g., sequentially or simultaneously) to the host server 100. A multiple item upload may be initiated via a single-step or multi-step user request. A multi-file upload request can be handled, processed, and executed, for example, through the multi-file upload manager 525.

In one embodiment, the multi-file upload manager 525 receives an identification of each of the multiple files to be uploaded (e.g., from the upload request processor 510) and sequentially prepares each individual file for uploading and uploads each file independently. For example, the upload manager 525 can compress one of the multiple files individually, upload it to the host server 100 and decompress the file when uploaded and proceed to perform the same steps with the next file. Preprocessing a file can include, for example, analyzing the file size and type to determine if it is acceptable/valid and/or to identify how best to compress the file. Post-processing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host server 100. The upload may automatically progress from one file when completed to the next one in sequence when the user initiates a multi-file upload request.

In one embodiment, the upload engine 520 uploads multiple items in a folder hierarchy based on a single request to upload a folder which has a hierarchy of folders inside, for example, via the folder upload manager 530. In one embodiment, the folder upload manager compresses the multiple items in the folder hierarchy in a single process into a single item and uploads the single item in a single upload process (rather than one by one) to the host server 100. After the merged file of multiple items has been uploaded, the folder upload manager 530 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allow the following overhead to be partially or wholly eliminated: repeatedly creating TCP connections for each upload, repeatedly checking the same permissions and storage quotas when processing the files on the server.

One embodiment of the host server 100 includes the user interface module 535, which preserves or enhances user experience before, during, or after an upload request. For example, the user interface module 535 can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 540 in the user interface module 535. In other words, while a file or item upload is in progress, the user can navigate to other pages to perform other actions or initiate additional actions on the current page without interrupting (stopping or pausing) the in-progress upload.

Similarly, when a multi-file or multi-item upload request is in progress, the user can also navigate away from the user interface which the upload request was submitted prior to completion of the uploading of each of the multiple items to the host server 100. Navigation between pages during an upload of multiple files can also be managed by the navigation manager 540. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 100 available for access through the user interface, even when some of the multiple items have not yet been uploaded to the host server, via the upload content access module 545, for example. Thus, during an active upload, individual files which have completed uploading can be accessed or interacted with by the user in the collaborative environment without having to wait for the full upload to complete.

In some instances, the item which has been uploaded to the host server is manipulatable by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

The application upgrade manager 575 having a configuration file updator module 576 and an application build identifier verification module 578 can create, update and/or distribute a configuration file. The configuration file updator module 576 can create and/or update a configuration file (e.g., configuration file 590) that is stored on a data store (e.g., data store 584) connected to or accessible from the host server 100. In one implementation, the configuration file can be a list of build identifiers (e.g., column 590a) that have been blacklisted, i.e., identified as mobile application versions for force upgrade. In other implementations, the configuration file can include additional fields of information such as, but not limited to: date 590b, action 590c, upgrade to 590d, and the like. The date field 590b can indicate, for example, the date on which the build identifier was added to the configuration file or the date that the mobile application corresponding to the build identifier was released. The action field 590c can identify, for example, a course of action to be taken by a mobile application having the corresponding build identifier. For example, an installed mobile application having a build identifier of "64bg7" can disable or shut down the application to force the user to upgrade to another version, while an installed mobile application having a build identifier of "7f756" can disable select features X, Y and Z, while leaving other features of the mobile application operational. The upgrade to field 590d can identify the version of the mobile application (if multiple versions of mobile application are available) to which the installed application should be upgraded to.

In one implementation, the configuration file updator module 576 can obtain new data or changed data for creating and/or updating a configuration file. In one implementation, the module can provide a user interface for inputting new data or editing data on the configuration file. The user interface may include options for adding, removing or editing build identifier 590a and in some implementations, one or more of the data fields 590b-d. In an alternate implementation, the creating and/or updating of the configuration file can be via command line.

One embodiment of the host server 100 can include the application build identifier verification module 578 for performing the build identifier verification on behalf of a requesting mobile application on a mobile device 400. The build identifier verification module 576 can receive the build identifier of an installed mobile application from a mobile device 400, and compare the received build identifier against the blacklisted build identifiers in the configuration file. The module can then send a notification or command to the installed mobile application to perform a recommended action (i.e., shut down, disable features, and the like).

One embodiment of the host server 100 includes a notification engine 550. The notification engine 550, can for example, update a feed stream to include an updated feed to indicate that an item or multiple items have been uploaded, for example, via the feed stream updator 555. The users that are notified can be selected, for example, by the recipient selector 565, and can include collaborators or the user, or other users meeting a criterion. In some instances, the feed stream is updated in real time or near real time relative to when the upload of the item completed. For real-time updating, the notification engine 550 can utilize another server, or another engine in the same server which provides push functionality.

The notification engine 550 can generally notify users, which can be collaborators of the user who performed the activity in the work space via one or more of many mechanisms, including but not limited to, email, SMS, voice-message, text-based message, RSS, feed, etc., as described in detail with further reference to related co-pending U.S. patent application Ser. No. 13/152,982 filed on Jun. 3, 2011. The contents of which are incorporated herein by reference in its entirety.

In one embodiment the notification is depicted through a web browser used by the other user to access the web-based collaboration environment, for access in real time or near real time to when the activity was performed by the user. When notifying a user in real time through a web-browser, the notification engine 550 can utilize a push-enabled se vice to ensure real time notification. In one embodiment, the notification is sent by a component or another server which implements push technology. For example, the notification can be sent via the notification server 150 shown in the example of FIG. 1. The push-enabled service can be implemented via long poll or HTTP streaming, for example, by the notification server 150 or another component, device which may be internal to or external to the host server 100.

In another embodiment, the notification can be to mobile applications on mobile devices using push technology. For example, the host server 100 can utilize other push servers including third party push servers to implement push technology such as, but not limited to mobile platform push systems and services (e.g., via smart phones or tablets or other portable devices such as iPhone, Android phones, Blackberry, iPad, Galaxy or other tablets, etc.). For example, Google Cloud Messaging for Android (GCM) or Apple push notification service (APNs) can be used to push notifications to mobile devices identified by mobile device token in iOS or registration identifier in Android.

In one implementation, a notification hub (e.g., Windows Azure Notification Hubs) can be used to broadcast push notifications to multiple mobile devices via mobile platforms such as the iOS, Android, and the like. A developer of a mobile application can configure a notification hub and register with a provider of the notification hub to broadcast notifications via mobile platform push notification services (e.g., GCM, APNs). In one implementation, the host server may broadcast a message to all registered mobile devices (i.e., mobile devices having the mobile application installed) by making a single application programming interface (API) call to the notification hub The notification hub can broadcast the message to all mobile devices listening for or registered to receive the notifications using mobile platform specific methods. In one implementation, the push notifications or messages can inform the mobile applications of any updates to the configuration file and trigger the mobile applications to download and check the configuration file. In a further implementation, the pushed messages can carry a payload of the updated configuration file or the changes made to the configuration file to the mobile applications on mobile devices.

Various other modules or components that have not been specifically discussed may be present in the host server. For example, a build script module may be present for generating build identifiers. The build script module may leverage Git or other version control systems to generate build identifiers, for example.

Figure 6:
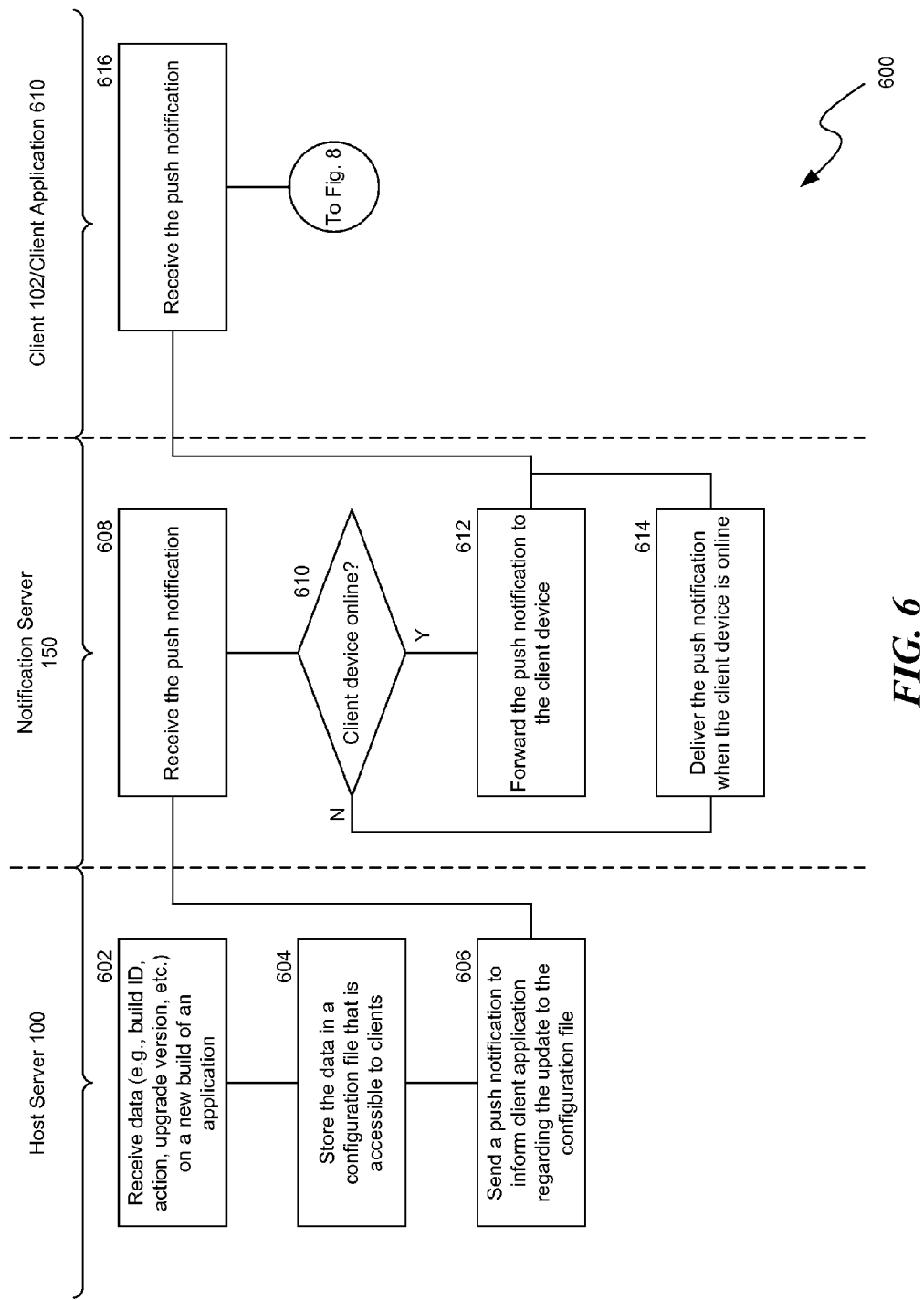
FIG. 6 depicts a logic flow diagram illustrating an example method for forcing upgrade of a mobile application via a notification server in accordance with a first embodiment of the disclosed systems and methods.

FIG. 6 depicts a logic flow diagram illustrating an example method 600 for forcing upgrade of a mobile application via a notification server in accordance with a first embodiment of the disclosed systems and methods.

In one implementation, the host server 100 receives data relating to one or more blacklisted versions of a mobile application at block 602. The data can include information concerning, for example, a build identifier, a date, an action, an upgrade to version, and/or the like. At block 604, the host server 100 creates (if there is no configuration file) and/or opens a configuration file, writes the received data and closes the configuration file. At block 606, the host server then creates and sends a notification to a notification servers 150 which, in one implementation, can include a notification hub and/or mobile platform servers to inform registered mobile devices about the update to the configuration file.

The notification server 150 receives the notification from the host server 100 at block 608. At decision block 610, if the mobile device is online, the push notification is forwarded to the mobile device at block 612. Alternately, if the mobile device is offline, the notification can be stored and delivered to the mobile device at a later time when the mobile device is online. At block 616, the mobile device 102 can receive the push notification, and provide the notification to the mobile application that is registered to receive the notification. The received notification can then trigger download of a configuration file, as described in detail with respect to FIG. 8.

Figure 7:
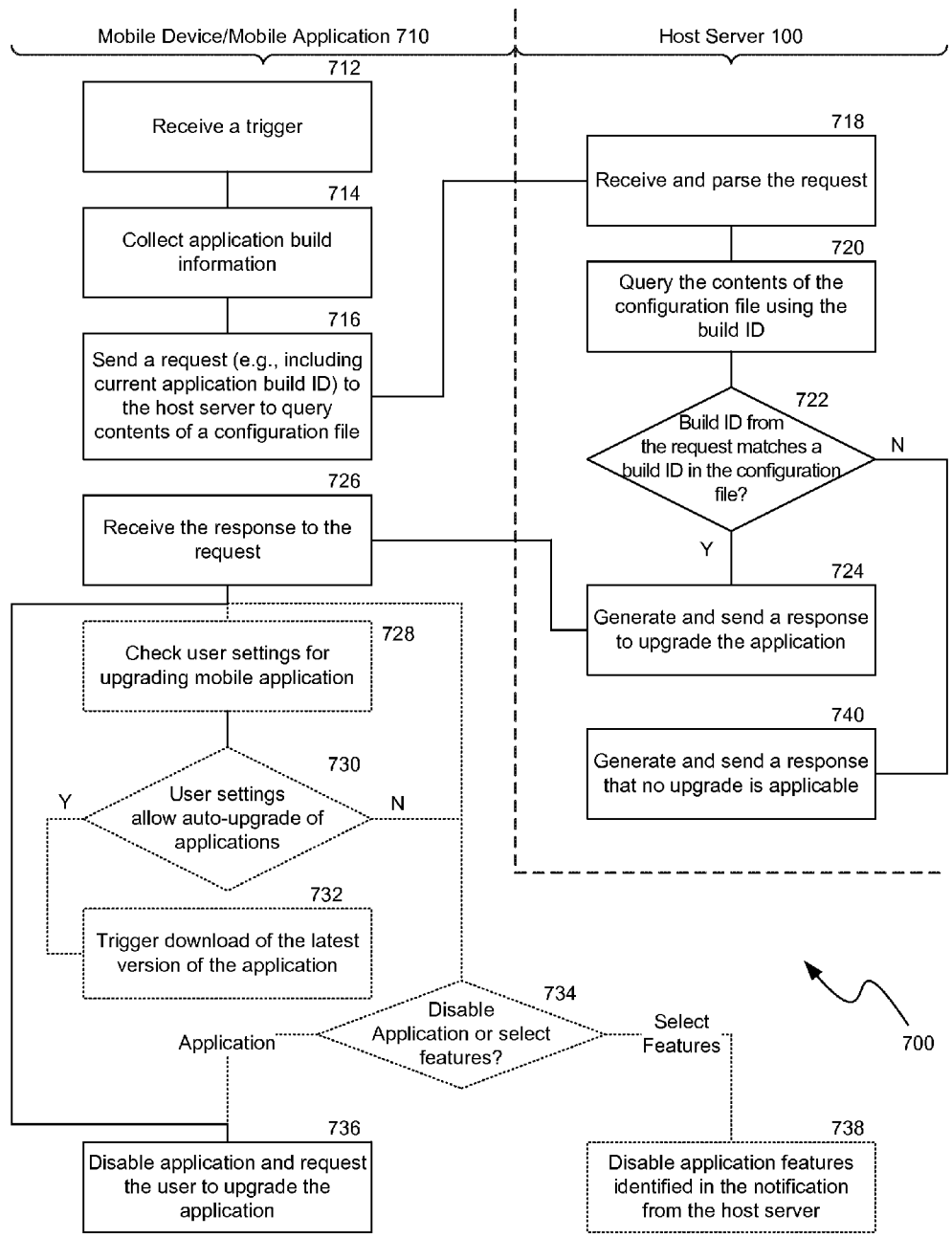
FIG. 7 depicts a logic flow diagram illustrating an example method for forcing upgrade of a mobile application using a server-based configuration file in accordance with a second embodiment of the disclosed systems and methods.

FIG. 7 depicts a logic flow diagram illustrating an example method 700 for forcing upgrade of a mobile application using a server-based configuration file in accordance with a second embodiment of the disclosed systems and methods.

In one implementation, at block 712, a mobile application 710 installed on a mobile device detects an event and generates a trigger. The event can be a push notification, scheduled date/time, launch of the mobile application, and the like. The trigger causes the mobile application to collect application build information at block 714. For example, the mobile application can determine its build identifier or number, and in some cases, other information such as mobile device identifier, OS version, and the like. At block 716, the mobile application can send a request to the host server 100 to query the contents of a configuration file. The request can include the information collected at block 714, for example.

The host server 100 receives and parses the request at block 718. Using information such as the build identifier of the installed mobile application 710, the host server 100 queries the contents of the configuration file stored at a location accessible to the host server 100 at block 720. At decision block 722, the host server 100 can determine if the build identifier of the installed mobile application 710 matches those listed in the configuration file. If there is a match, the installed mobile application 710 is identified as a blacklisted version. At block 724, the host server generates and sends a response to the mobile device requesting the mobile application 710 to upgrade to another version. Alternately, if the build identifier is not listed in the configuration file, the installed application 710 is not blacklisted, and the host server 100 generates and sends a response to the mobile device to indicate that an upgrade is not applicable at block 740. The mobile application 710 installed on the mobile device can then operate normally.

At block 726, the mobile application 710 receives the response from the host server 100. Based on the response, the mobile application can shut down or disable its functions and request a user of the mobile application 710 to update or upgrade the mobile application at block 736. Alternately, the response from the host server can specify whether to disable the mobile application in its entirety or only select features or functions as depicted by decision block 734. If the decision is to disable the application, the mobile application 710 shuts down and requests the user to upgrade the mobile application 710 in order to use the mobile application at block 736. If the decision is to disable select features, the mobile application 710 can turn off the identified features or functions and inform the user to upgrade the mobile application in order to have the features turned back on at block 738. In yet another implementation, the mobile application may check user settings for upgrading the mobile application 710 (e.g., those provided by the upgrade management setting module 428) at block 728. At decision block 730, the mobile application can determine if the user settings allow auto upgrade of the mobile application. If so, the mobile application 710 can trigger download of the latest or recommended version of the mobile application at block 732. In a further implementation, the downloaded mobile application can be automatically installed or installed upon receiving a user confirmation. Alternately, at decision block 730, if the user settings do not allow auto upgrade, the process can move to block 734, or in some cases directly to block 736.

Figure 8:
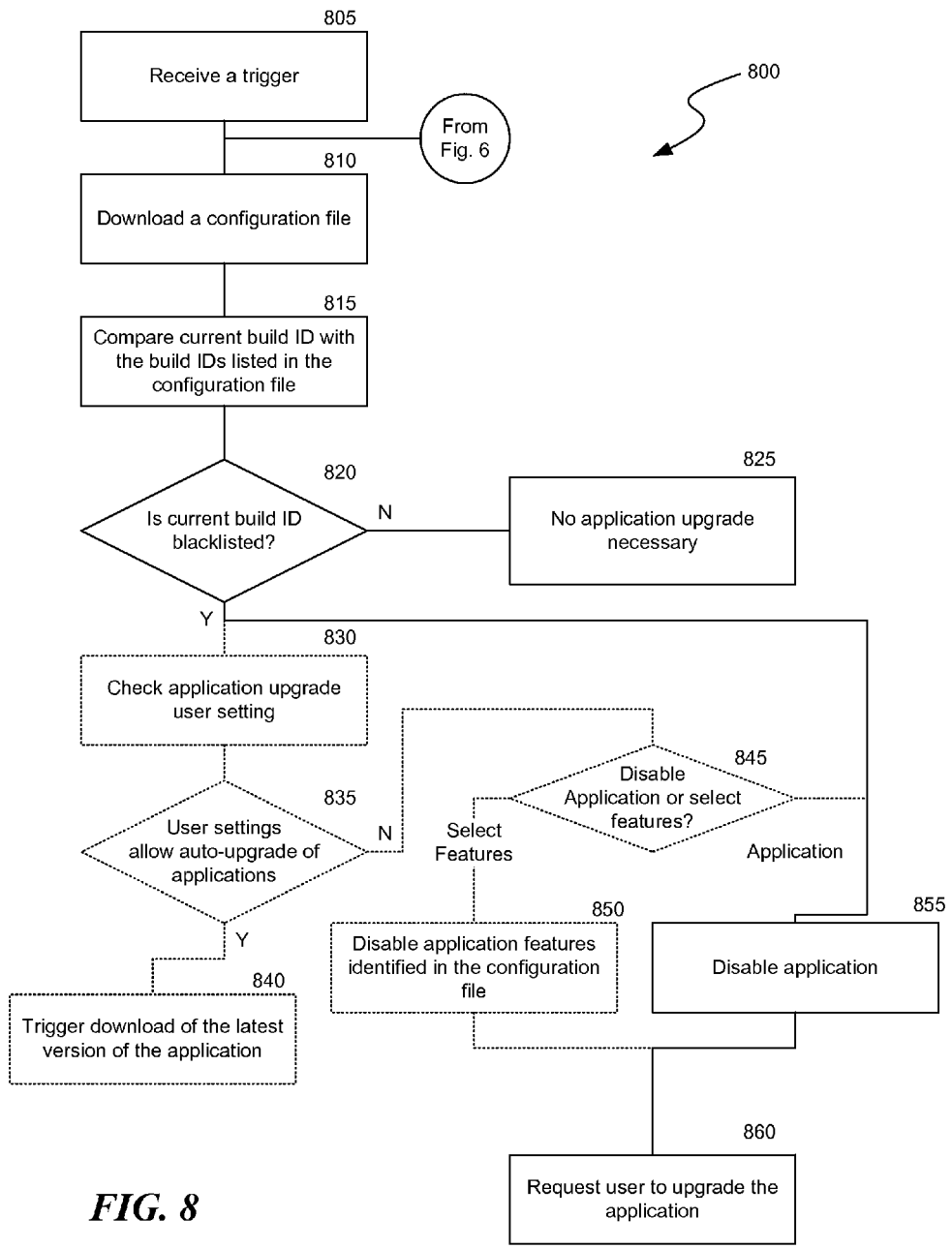
FIG. 8 depicts a logic flow diagram illustrating an example method for forcing upgrade of a mobile application using a server-based configuration file in accordance with a third embodiment of the disclosed systems and methods.

FIG. 8 depicts a logic flow diagram illustrating an example method 800 for forcing upgrade of a mobile application using a server-based configuration file in accordance with a third embodiment of the disclosed systems and methods.

In one implementation, at block 805, a mobile application installed on a mobile device can receive a trigger. The trigger can be generated when an event such as the launch of an application, receiving of push notification, etc., is detected (e.g., via the configuration file request event detector module 414). At block 810, the mobile application can download a configuration file from a server such as the host server 100 or another server hosting the configuration file. The configuration file can include a list of build identifiers corresponding to versions of mobile applications that have been blacklisted for security, stability, usability or any other concerns.

At block 815, the mobile application can read the contents of the configuration file and compare the build identifier of the installed mobile application with the listed build identifiers. In one implementation, at decision block 820, if the build identifier of the installed mobile application is different from the blacklisted build identifiers, no upgrade is necessary at block 825. The mobile application can perform its operations normally. Alternately, if the build identifier of the installed mobile application matches one of the blacklisted build identifiers, the mobile application can disable itself at block 855 and request a user of the mobile application to upgrade to another version in order to use the mobile application.

In other implementations, the mobile application can check user settings for upgrading application (e.g., block 830), and trigger download of the latest or recommended version of the mobile application at block 840, if the user settings allow auto upgrade at decision block 835. If an auto upgrade is not allowed, the mobile application can disable select features at block 850, or disable the mobile application at block 855, based on the decision at block 845. At block 860, the user of the mobile application can be requested to upgrade the mobile application to remove operational restrictions imposed on the mobile application.

Figure 9:
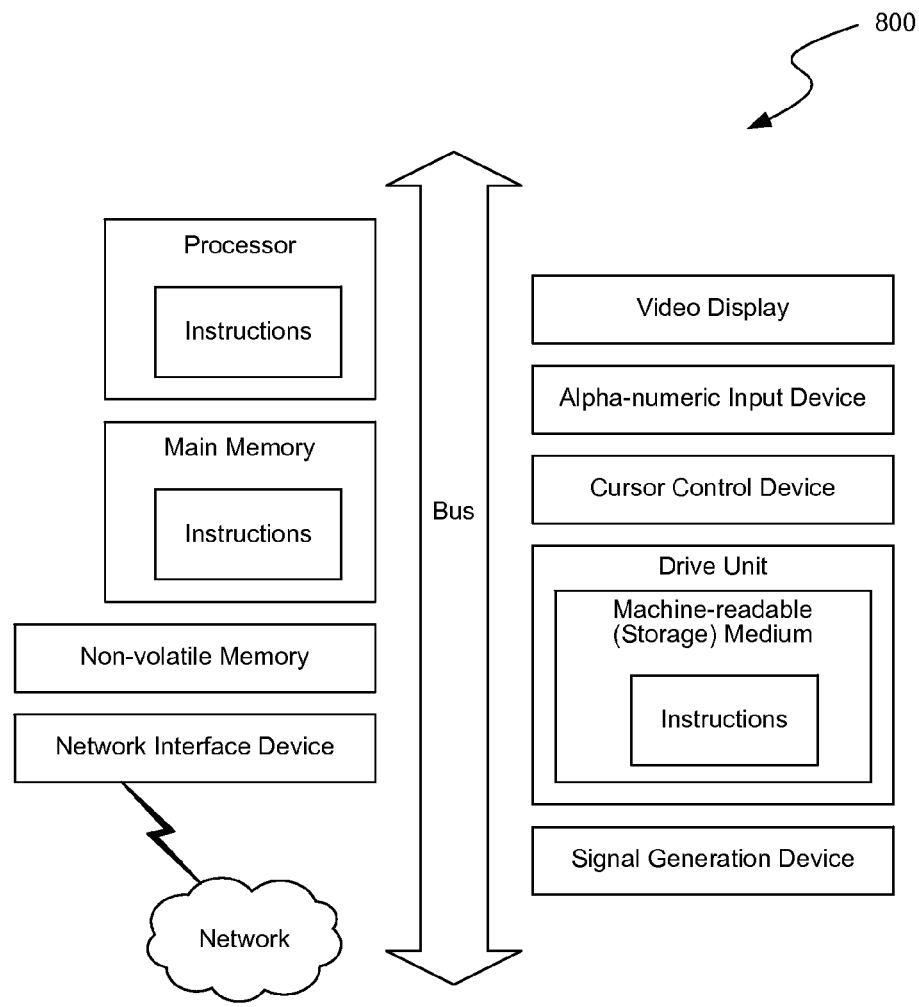
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 900 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, 16, other aspects may likewise be embodied as a means-plus-function claim, or in other forms, such as being embodied in a computer-readable medium. (Any claims intended to be treated under 35 U.S.C. §112, 16 will begin with the words "means for".) Accordingly, the applicant reserves the right to add additional claims after filing the application to pursue such additional claim forms for other aspects of the disclosure.

The invention claimed is:

1. A method for forcing an upgrade of a mobile application operating on a mobile device, comprising:
   using a configuration file including at least one build identifier, wherein each build identifier corresponds to a version of the mobile application;
   comparing a build identifier of the mobile application operating on the mobile device to the at least one build identifier in the configuration file;
   based on the comparing, restricting operation of the mobile application on the mobile device to force upgrade of the mobile application, wherein if automatic upgrade of the mobile application is disabled, the restricting includes selectively disabling one or more functions, including a data exporting function, of the mobile application until the force upgrade of the mobile application is complete; and
   providing a notification, within the mobile application to a user, that indicates that the one or more functions of the mobile application are disabled until the force upgrade of the mobile application is complete.

2. The method of claim 1, further comprising:
   broadcasting a push notification via a push notification service to the mobile device and a plurality of other mobile devices having a version of the mobile application previously or currently installed.

3. The method of claim 2, wherein the push notification indicates an update to the configuration file, and the using is in response to the push notification.

4. The method of claim 1, wherein the using of the configuration file is initiated:
   according to a schedule, or
   when the mobile application on the mobile device is started, or
   in response to a push notification.

5. The method of claim 1, wherein the one or more functions of the mobile application are identified in the configuration file for each of the at least one build identifier in the configuration file.

6. The method of claim 1, further comprising:
   triggering download of another version of the mobile application based on a user setting to force upgrade of the mobile application on the mobile device.

7. A system for upgrading a mobile application installed and operating on a mobile device, comprising:
   a processor for executing the computer-executable instructions stored in a memory; and
   the memory storing computer-executable instructions of:
      a download module for downloading a configuration file including at least one build identifier, wherein each build identifier corresponds to a version of the mobile application;
      a build identifier verification module for determining whether a build identifier of the mobile application operating on the mobile device matches the at least one build identifier in the configuration file; and
      an application disabling module for restricting operation of the mobile application on the mobile device when the build identifier corresponding to the mobile application is listed in the configuration file, wherein if automatic upgrade of the mobile application is disabled, the restricting includes:
         selectively disabling one or more functions of the mobile application, including a data exporting function, until the upgrade of the mobile application is complete, and providing a notification, within the mobile application to a user, that indicates that the one or more functions of the mobile application are disabled until the upgrade of the mobile application is complete.

8. The system of claim 7, further comprising:
   a module for receiving a push notification broadcasted via a push notification service to the mobile device and a plurality of other mobile devices having a version of the mobile application previously or currently installed.

9. The system of claim 8, wherein the push notification indicates an update to the configuration file and triggers the download module to download the configuration file.

10. The system of claim 7, wherein the disabled one or more functions in the mobile application are identified in the configuration file.

11. The system of claim 7, further comprising:
an auto upgrade module for triggering download of another version of the mobile application based on a user setting to upgrade the mobile application installed on the mobile device.

12. The system of claim 7, further comprising:
an upgrade notification module for requesting a user of the mobile device to upgrade the mobile application installed on the mobile device to another version of the mobile application.

13. A host server used to upgrade a mobile application operating on a mobile device, the host server comprising:
a memory to store a configuration file;
a processor configured to:
update the configuration file to include at least one build identifier, wherein each build identifier in the configuration file corresponds to a version of the mobile application released for download;
compare a build identifier of the mobile application operating on the mobile device to the at least one build identifier in the configuration file;
based on the comparison, instruct the mobile application to restrict the operation of the mobile application, wherein if automatic upgrade of the mobile application is disabled, the restricting includes selectively disabling one or more functions, including a data exporting function, of the mobile application until the upgrade of the mobile application is complete; and
providing a notification, within the mobile application to a user, that indicates that the one or more functions of the mobile application are disabled until the upgrade of the mobile application is complete.

14. The host server of claim 13, further comprising:
a notification engine configured to send a push notification for broadcast to the mobile device and a plurality of other mobile devices that have a version of the mobile application installed.

15. The host server of claim 14, wherein the push notification informs the mobile application of the update to the configuration file.

16. The host server of claim 14, wherein the push notification provides the configuration file to the mobile device.

17. The host server of claim 13, wherein host server provides a cloud-based collaboration platform or a file sharing service.

18. A non-transitory machine readable storage medium encoded with instructions for performing a method for forcing an upgrade of a mobile application operating on a mobile device, the instructions comprising:
instructions to use a configuration file including at least one build identifier, wherein each build identifier corresponds to a version of the mobile application;
instructions to compare a build identifier of the mobile application operating on the mobile device to the at least one build identifier in the configuration file;
based on the comparison, instructions to restrict operation of the mobile application on the mobile device to force upgrade of the mobile application, wherein if automatic upgrade of the mobile application is disabled, the restricting includes selectively disabling one or more functions, including a data exporting function, of the mobile application until the force upgrade of the mobile application is complete; and
providing a notification, within the mobile application to a user, that indicates that the one or more functions of the mobile application are disabled until the force upgrade of the mobile application is complete.

19. The non-transitory machine readable storage medium of claim 18, further comprising:
instructions to broadcast a push notification to the mobile device and a plurality of other mobile devices having a version of the mobile application previously or currently installed.

20. The non-transitory machine readable storage medium of claim 19, wherein the push notification indicates an update to the configuration file, and the instructions to use are executed in response to the push notification.

21. The non-transitory machine readable storage medium of claim 18, wherein instructions to use the configuration file are executed:
according to a schedule, or
when the mobile application on the mobile device is started, or
in response to a push notification.

22. The non-transitory machine readable storage medium of claim 18, wherein the one or more functions of the mobile application are identified in the configuration file.

23. The non-transitory machine readable storage medium of claim 18, further comprising:
instructions to trigger download of another version of the mobile application based on a user setting to force upgrade of the mobile application on the mobile device.

* * * * *